(12) United States Patent
Hayashi

(10) Patent No.: US 11,456,489 B2
(45) Date of Patent: Sep. 27, 2022

(54) NONAQUEOUS ELECTROLYTE SECONDARY BATTERY, AND METHOD FOR PRODUCING A NONAQUEOUS ELECTROLYTE SECONDARY BATTERY

(71) Applicant: TOYOTA JIDOSHA KABUSHIKI KAISHA, Toyota (JP)

(72) Inventor: Kunihiko Hayashi, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/240,208

(22) Filed: Apr. 26, 2021

(65) Prior Publication Data

US 2021/0257673 A1    Aug. 19, 2021

Related U.S. Application Data

(62) Division of application No. 16/242,528, filed on Jan. 8, 2019, now abandoned.

(30) Foreign Application Priority Data

Jan. 9, 2018    (JP) ................. 2018-001517

(51) Int. Cl.
*H01M 50/414* (2021.01)
*H01M 50/411* (2021.01)
(Continued)

(52) U.S. Cl.
CPC ..... *H01M 10/0587* (2013.01); *H01M 10/045* (2013.01); *H01M 10/0525* (2013.01);
(Continued)

(58) Field of Classification Search
CPC combination set(s) only.
See application file for complete search history.

(56) References Cited

U.S. PATENT DOCUMENTS

| 6,420,066 B1 | 7/2002 | Frustaci et al. |
| 2006/0204849 A1 | 9/2006 | Saito et al. |

(Continued)

FOREIGN PATENT DOCUMENTS

| JP | H 09/223518 | * | 8/1997 | ............ H01M 10/04 |
| JP | H09-223518 A |  | 8/1997 |  |

(Continued)

OTHER PUBLICATIONS

English translation of JPH 09/223518 (Year: 1997).*

*Primary Examiner* — Yoshitoshi Takeuchi
(74) *Attorney, Agent, or Firm* — Sughrue Mion, PLLC

(57) ABSTRACT

The present invention provides a technology that allows supplying stably a nonaqueous electrolyte secondary battery having a high capacity retention rate and being excellent in resistance to deterioration. The nonaqueous electrolyte secondary battery disclosed herein is provided with a wound electrode body resulting from winding a stack 10 having a stacking of a positive electrode 50 and a negative electrode 60 across separators 70. The positive electrode 50 has a foil-shaped positive electrode collector 52 and a positive electrode mix layer 54. Each separator 70 has a resin substrate layer 72 and a heat resistance layer 74. In the nonaqueous electrolyte secondary battery disclosed herein, the peel strength of a boundary between the resin substrate layer and the heat resistance layer is 16 N/m or more and 155 N/m or less, and the density of the positive electrode mix layer is 2.3 g/cc or more and 2.6 g/cc or less. In this the nonaqueous electrolyte secondary battery, sufficient flexibility of the stack 10 as a whole can be secured even when using high-peel strength separators 70 in order to increase resistance to deterioration. Drops in production efficiency can be suitably suppressed as a result.

1 Claim, 7 Drawing Sheets

(51) Int. Cl.
*H01M 50/449* (2021.01)
*H01M 10/0587* (2010.01)
*H01M 10/0525* (2010.01)
*H01M 10/04* (2006.01)
*H01M 50/40* (2021.01)

(52) U.S. Cl.
CPC ......... *H01M 50/40* (2021.01); *H01M 50/411* (2021.01); *H01M 50/449* (2021.01)

(56) References Cited

U.S. PATENT DOCUMENTS

| | | |
|---|---|---|
| 2009/0111026 A1 | 4/2009 | Kim et al. |
| 2014/0004400 A1* | 1/2014 | Ueki .................. H01M 10/052 |
| | | 429/94 |
| 2014/0023908 A1 | 1/2014 | Ueki et al. |
| 2014/0170464 A1* | 6/2014 | Iwase .................. H01M 50/446 |
| | | 429/144 |
| 2015/0140389 A1 | 5/2015 | Nagai et al. |
| 2015/0147462 A1 | 5/2015 | Inaba et al. |
| 2016/0276641 A1 | 9/2016 | Umeyama et al. |
| 2016/0308185 A1 | 10/2016 | Kondo et al. |
| 2018/0315970 A1 | 11/2018 | Terashima et al. |

FOREIGN PATENT DOCUMENTS

| | | |
|---|---|---|
| JP | 2006-244834 A | 9/2006 |
| JP | 2016-100135 A | 5/2016 |
| WO | 2012/124093 A1 | 9/2012 |
| WO | 2012/131883 A1 | 10/2012 |

\* cited by examiner

NONAQUEOUS ELECTROLYTE SECONDARY BATTERY, AND METHOD FOR PRODUCING A NONAQUEOUS ELECTROLYTE SECONDARY BATTERY

CROSS-REFERENCE TO RELATED APPLICATION(S)

The present application is a divisional application of U.S. application Ser. No. 16/242,528, filed Jan. 8, 2019, which claims priority to Japanese Patent Application No. 2018-1517 filed on Jan. 9, 2018, the entire contents of each of which is incorporated into the present specification by reference.

BACKGROUND OF THE INVENTION

1. Field of the Invention

The present invention relates to a nonaqueous electrolyte secondary battery. More specifically, the present invention relates to a nonaqueous electrolyte secondary battery provided with a wound electrode body resulting from winding a stack having a stacking of a positive electrode and a negative electrode across a separator, and to a method for producing a nonaqueous electrolyte secondary battery.

2. Description of the Related Art

Nonaqueous electrolyte secondary batteries (hereafter also simply referred to as "secondary batteries") such as lithium ion secondary batteries and nickel-hydride batteries are lightweight and afford high energy density, and accordingly have come to be preferably used as power sources for vehicle drive and as portable power sources for portable devices. In particular, lithium ion secondary batteries have characteristically high capacity and excellent high-rate charge/discharge properties (rapid charge/discharge properties), and hence are preferably used as high-output power sources for vehicle drive.

For instance a wound electrode body is used as a power generation element in such nonaqueous electrolyte secondary batteries. The wound electrode body is produced by forming a stack resulting from laying up a positive electrode, a negative electrode and a separator, and through winding of the stack. The separator in the wound electrode body is disposed between the positive electrode and the negative electrode, and prevents the occurrence of internal short-circuits due to contact between the electrodes. A plurality of small holes that let charge carriers through is formed in the separator, such that ion conduction paths (conductive paths) become formed between the electrodes via these small holes.

Rapid rises in the temperature of the secondary battery, for instance due to an internal short-circuit, may result in significant thermal deformation of the separator, and in further progress of heat generation derived from an expanding short-circuit surface area. Separators provided with a heat resistance layer (URL) have been proposed in recent years in order to prevent the occurrence of such cascading heat generation. The heat resistance layer, which contains metal oxide particles (inorganic filler) excellent in heat resistance suppresses thermal deformation of the separator, thereby curtailing the progress of cascading heat generation derived from an expanding short-circuit surface area.

When a separator provided with the above-described heat resistance layer is used, however, ion conduction paths between the electrodes may become smaller thereby impairing high-rate charge/discharge properties. WO 2012/124093 discloses the feature of providing a heat resistance layer having a porosity of 55% or higher, in order to suppress drops in high-rate charge/discharge properties. On the other hand, a heat resistance layer of high porosity exhibits a small contact area with the substrate (resin substrate layer), and hence the heat resistance layer peels off readily. In WO 2012/124093 the peel strength is therefore adjusted to be 2.9 N/m or greater.

WO 2012/124093 indicates that an increase in the peel strength of the heat resistance layer of the separator entails an increase in the capacity retention rate of the secondary battery, and thereby in improved resistance to deterioration. Specifically. WO 2012/124093 indicates that when the peel strength of the heat resistance layer is between 2 N/m to 6 N/m. the capacity retention rate rises abruptly as a result of the increased peel strength, while when the peel strength exceeds 6 N/m. the capacity retention rate rises gently accompanying an increase in peel strength.

However when the peel strength of the heat resistance layer is excessively high, the flexibility of the separator decreases, and assemblability of the separator may be impaired (the production efficiency of the wound electrode body may drop). In the technology disclosed in WO 2012/124093 the upper limit of the peel strength of the heat resistance layer is therefore set to 15.1 N/m.

SUMMARY OF THE INVENTION

The field of for instance drive power sources for hybrid vehicles (HV) has witnessed in recent years a pressing demand for sustaining stable charging and discharge over long periods of lime, to a greater degree than in conventional instances. It is a main object of the present invention, arrived at in order to meet the above demand, to provide a technology that allows supplying stably a nonaqueous electrolyte secondary battery having a high capacity retention rate and being excellent in resistance to deterioration.

The present invention provides a nonaqueous electrolyte secondary battery having the features below, so as to attain the above goal.

The nonaqueous electrolyte secondary battery disclosed herein is provided with a wound electrode body resulting from winding a stack having a stacking of a positive electrode and a negative electrode across a separator. The positive electrode of the nonaqueous electrolyte secondary battery has a foil-shaped positive electrode collector, and a positive electrode mix layer provided on a surface of the positive electrode collector; and the separator has a resin substrate layer containing an insulating resin, and a heat resistance layer formed on one face of the resin substrate layer.

In the nonaqueous electrolyte secondary battery disclosed herein, the peel strength of a boundary between the resin substrate layer and the heat resistance layer is 16 N/m or more and 155 N/m or less, and the density of the positive electrode mix layer is 2.3 g/cc or more and 2.6 g/cc or less.

In the development of a nonaqueous electrolyte secondary battery having excellent resistance to deterioration, the inventors focused on a separator (hereafter also referred to as "high-peel strength separator") in which the peel strength of a boundary between the resin substrate layer and the heat resistance layer is 16 N/m or greater.

Specifically, the capacity retention rate may increase, although gently, when using a high-peel strength separator as described above. The inventors speculated that using such a high-peel strength separator is necessary in order to improve resistance to deterioration, by further increasing the capacity retention rate, having been improved conventionally in various ways.

In conventional art, as explained above, high-peel strength separators are one cause of loss of production efficiency of wound electrode bodies, and accordingly the inventors deemed that the use of a high peel strength separator would involve difficulties. That is because the flexibility of the entire stack containing the separator decreases, and it is difficult to wind the stack, when using a high-peel strength separator of low flexibility.

In the light of the above considerations, the inventors surmised that a nonaqueous electrolyte secondary battery having excellent resistance to deterioration could be supplied stably if a technology were developed that allows using a high-peel strength separator without a drop in production efficiency of the wound electrode body.

The inventors conducted various studies in order to develop such a technology, and speculated that the flexibility of the stack as a whole can be sufficiently secured, even when using a high-peel strength separator, if there is adjusted the flexibility of sheet-shaped members (positive electrode and negative electrode) other than the separator.

Conceivable means for adjusting the flexibility of the positive electrode and the negative electrode include for instance modifying the materials (active material, collector and so forth) of the electrodes. However, modifying electrode materials entails significant changes in battery characteristics, and therefore necessitates substantial design changes. Therefore, the inventors conducted further experimentation and study on means for adjusting the flexibility of the stack as a whole without incurring significant design changes, and came to the approach of adjusting the density of the positive electrode mix layer. The flexibility of the positive electrode can be increased by lowering the density of the positive electrode mix layer, and as a result it becomes possible to secure sufficient flexibility in the stack as a whole, despite the use of a high-peel strength separator having low flexibility. The density of the positive electrode mix layer can be adjusted by relying on a comparatively easy means such as adjusting pressure during rolling of the positive electrode, with little chance of battery characteristics being significantly affected thereby.

In the nonaqueous electrolyte secondary battery disclosed herein, arrived at on the basis of the above findings, the peel strength of the boundary between the resin substrate layer and the heat resistance layer is 16 N/m or more and 155 N/m or less, anti the density of the positive electrode mix layer is 2.3 g/cc or more and 2.6 g/cc or less.

The flexibility of the positive electrode can be increased by providing thus a positive electrode mix layer having a density of 2.6 g/cc or lower (hereafter also referred to as "low-density positive electrode mix layer"). As a result, sufficient flexibility of the stack as a whole can be secured even when using a high-peel strength separator, in which the peel strength of the boundary between the resin substrate layer and the heat resistance layer is 16 N/m or greater. Accordingly, the nonaqueous electrolyte secondary battery disclosed herein allows using a high-peel strength separator without a drop in production efficiency of the wound electrode body, and hence better resistance to deterioration can be brought out than in conventional instances.

If the peel strength of the boundary between the resin substrate layer and the heat resistance layer is excessively high, not only does production efficiency of the wound electrode body drop, but also the inter-electrode distance between the positive and negative electrodes during charging and discharge may become uneven due to insufficient flexibility of the separator. This is problematic in that for instance degradation gas may intrude between the positive and negative electrodes, and the nonaqueous electrolyte solution may become non-uniform, which might impair resistance to deterioration. In view of the above considerations, the peel strength of the heat resistance layer of the nonaqueous electrolyte secondary battery disclosed herein is set to 155 N/m or less.

If the density of the positive electrode mix layer is lowered excessively, the rigidity of the positive electrode drops significantly: the positive electrode may then break on account of the tension acting thereon during winding of the stack, and the shape of the produced wound electrode body be prone to collapsing. This may result in consequence in a lower production efficiency. Such being the case, the density of the positive electrode mix layer in the nonaqueous electrolyte secondary battery disclosed herein is set to be 2.3 g/cc or higher.

In a preferred implementation of the nonaqueous electrolyte secondary battery disclosed herein, the heat resistance layer is formed on a surface of the resin substrate layer so as to oppose the positive electrode mix layer.

The electrode that is set to oppose the heat resistance layer of the separator is not particularly limited, and the above-described effect of the present invention can be exerted both when the heal resistance layer faces the positive electrode and when the heat resistance layer faces the negative electrode. Preferably, however, the heat resistance layer heat the positive electrode mix layer are set to oppose each other, with a view to improving production efficiency more suitably. It is deemed that lubricity and chargeability of the boundary between the heat resistance layer and the positive electrode mix layer are improved, thereby-facilitating winding of the stack, when the heat resistance layer and the positive electrode mix layer are set to oppose each other.

In a preferred implementation of the nonaqueous electrolyte secondary battery disclosed herein, the peel strength of the boundary between the resin substrate layer and the heat resistance layer is 21 N/m or more and 102 N/m or less.

The capacity retention rate of the secondary battery can be increased more suitably by adjusting the peel strength of the boundary between the resin substrate layer and the heat resistance layer to be in the above range. When the peel strength is adjusted to be in the above range, a novel effect is exerted, namely suppression of degradation in high-rate charge/discharge properties, which as a result allows enhancing resistance to deterioration more suitably.

In a preferred implementation of the non aqueous electrolyte secondary battery disclosed herein, the ratio of the thickness of the heal resistance layer with respect to the thickness of the separator is 0.1 to 0.4.

If the heat resistance layer is excessively thin with respect to the separator as a whole, it becomes difficult to suppress thermal deformation in the separator when the temperature of the battery rises, and it may become impossible to suitably curtail occurrence of cascading heat generation derived from an expanding short-circuit surface area. If the heat resistance layer is too thick, on the other hand, the flexibility of the separator decreases, and production efficiency of the wound electrode body may be impaired. In the light of the above considerations, the ratio of the thickness of the heat resistance layer with respect to the thickness of the separator is adjusted to 0.1 to 0.4.

In a preferred implementation of the nonaqueous electrolyte secondary battery disclosed herein, the heat resistance layer contains a filler made of an inorganic material, and a binder, and the weight ratio of the filler and the binder is in a range of 90:10 to 92:8.

One example of a concrete means for adjusting the peel strength of the boundary between the resin substrate layer and the heat resistance layer involves adjusting the content of binder in the heat resistance layer. In this case the weight ratio of the filler and the hinder is preferably set to be 90:10 to 92:8, as described above. The peel strength of the boundary between the resin substrate layer and the heat resistance layer can be adjusted easily as a result to 16 N/m or more and 155 N/m or less.

In another aspect, the present invention provides a method for producing a nonaqueous electrolyte secondary battery.

The method for producing a nonaqueous electrolyte secondary battery disclosed herein is a method for producing a nonaqueous electrolyte secondary battery in which a wound electrode body and a nonaqueous electrolyte solution are accommodated in a case. The production method includes a winding step of producing a wound electrode body by producing a stack through laying of a positive electrode and a negative electrode across a separator, and winding the stack: and a sealing step of accommodating the wound electrode body and the nonaqueous electrolyte solution within the case, and sealing the case.

The positive electrode has a foil-shaped positive electrode collector, and a positive electrode mix layer provided on a surface of the positive electrode collector; and the separator has a resin substrate layer containing an insulating resin, and a heat resistance layer formed on one face of the resin substrate layer.

In the production method disclosed herein, the peel strength of the boundary between the resin substrate layer and the heat resistance layer is set to 16 N/m or more and 155 N/m or less and the density of the positive electrode mix layer is set to 2.3 g/cc or more and 2.6 g/cc or less.

As described above, using a positive electrode having a low-density positive electrode mix layer allows securing sufficient flexibility of a stack as a whole even when using a high-peel strength separator. As a result the stack can be wound suitably, and drops in the production efficiency of the wound electrode body can likewise be suppressed suitably. A secondary battery that utilizes that high-peel strength separator boasts a high capacity retention rate, and is excellent in resistance to deterioration. Therefore, the production method disclosed herein allows supplying stably a nonaqueous electrolyte secondary battery having a high capacity retention rate and being excellent in resistance to deterioration.

In a preferred implementation of the method for producing a nonaqueous electrolyte secondary battery disclosed herein, tension in the positive electrode and on the negative electrode during winding of the slack is set to be higher than the tension in the separator.

Lubricity at the boundaries of the positive electrode, the negative electrode and the separator is increased as a result, and winding deviations are thereby suppressed more suitably. In consequence, the production efficiency of the wound electrode body can be suitably increased.

In a preferred implementation of the method for producing a nonaqueous electrolyte secondary battery disclosed herein, the tension in the positive electrode and the negative electrode is adjusted to be 2.5 N to 12.0 N. and the tension in the separator is adjusted to be 1.0 N to 6.0 N.

If the tensions in each of the sheet-shaped members, namely the positive electrode, the negative electrode and the separator, is excessively high, the sheet-shaped members may break during winding. On the other hand, winding defects such as winding deviation may occur if tensions tire excessively low. With the above in mind, the tensions in the respective sheet-shaped members are preferably adjusted to lie in the above ranges during winding of the stack, by setting the tension in the positive electrode and the negative electrode to be higher than the tension in the separator.

DETAILED DESCRIPTION OF THE PREFERRED EMBODIMENTS

Figure 1:
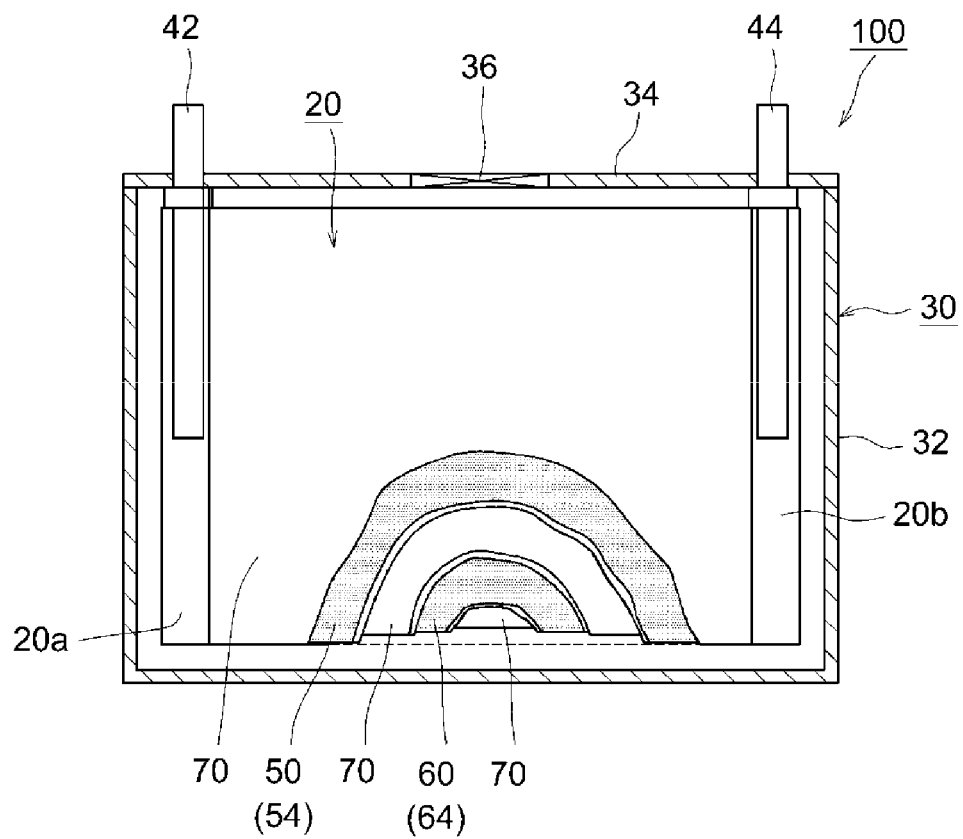
FIG. 1 is a partial cross-sectional diagram illustrating schematically a lithium ion secondary battery according to an embodiment of the present invention.

Embodiments of the present invention will be explained below with reference to accompanying drawings, in the drawings below, members and portions that exert identical effects are denoted with identical reference symbols. The dimensional relationships (length, width, thickness and so forth) in the figures do not reflect actual dimensional relationships. Any features other than the matter specifically set forth in the present specification and that may be necessary for carrying out the present invention (for instance, the detailed structure of a ease or of electrode terminals) can be regarded as instances of design matter, for a person skilled in the art, based on known technologies in the relevant technical field.

A lithium ion secondary battery will be explained below as an example of the nonaqueous electrolyte secondary battery disclosed herein, but the explanation is not meant to limit the object of the present invention to lithium ion secondary batteries. In the present specification, the term "nonaqueous electrolyte secondary battery" denotes a device that is charged and discharged as a result of the movement of charge carriers via a nonaqueous electrolyte solution, and encompasses not only so-called storage batteries such as lithium ion secondary batteries and nickel-hydride batteries but also electric storage elements such as electrical double layer capacitors.

1. Lithium Ion Secondary Battery According to Present Embodiment

FIG. 1 is a partial cross-sectional diagram illustrating schematically a lithium ion secondary battery according to the present embodiment. As illustrated in FIG. 1, a lithium ion secondary battery 100 according to the present embodiment is made of a wound electrode body 20 and a nonaqueous electrolyte solution (not shown) accommodated inside a case 30. The various members will be explained below.

(1) Case

The case 30 is made of a lightweight metallic material having good thermal conductivity, such as aluminum. The case 30 is provided with a square case body 32 having an opening formed at the top face, and with a lid body 34 that plugs the opening of the top face of the case body 32.

Electrode terminals (positive electrode terminal 42 and negative electrode terminal 44) connected to an external device are provided in the lid body 34 that constitutes the top face of the case 30. The positive electrode terminal 42 and the negative electrode terminal 44 are each electrically connected to the wound electrode body 20 inside the case 30. Besides the electrode terminal, in the top face of the case 30 there are formed as well a safety valve 36 for preventing rises in pressure inside the ease 30, and a filling port (not shown) for injecting a nonaqueous electrolyte solution.

(2) Wound Electrode Body

Figure 2:
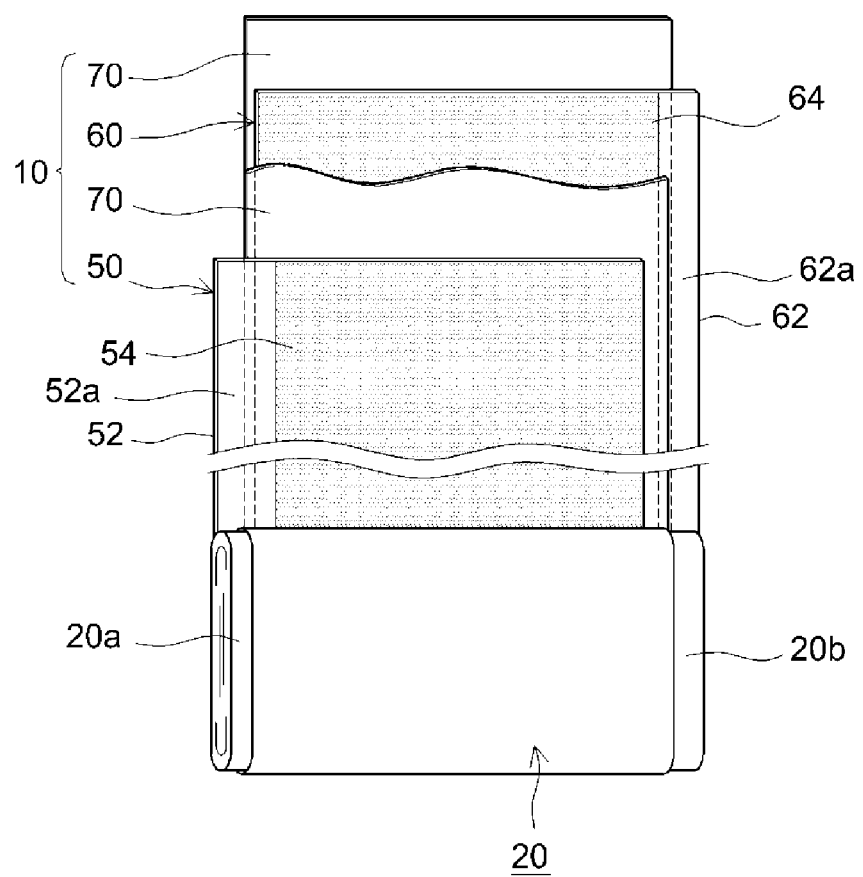
FIG. 2 is a perspective-view diagram illustrating schematically a wound electrode body of a lithium ion secondary battery according to an embodiment of the present invention.
Figure 3:
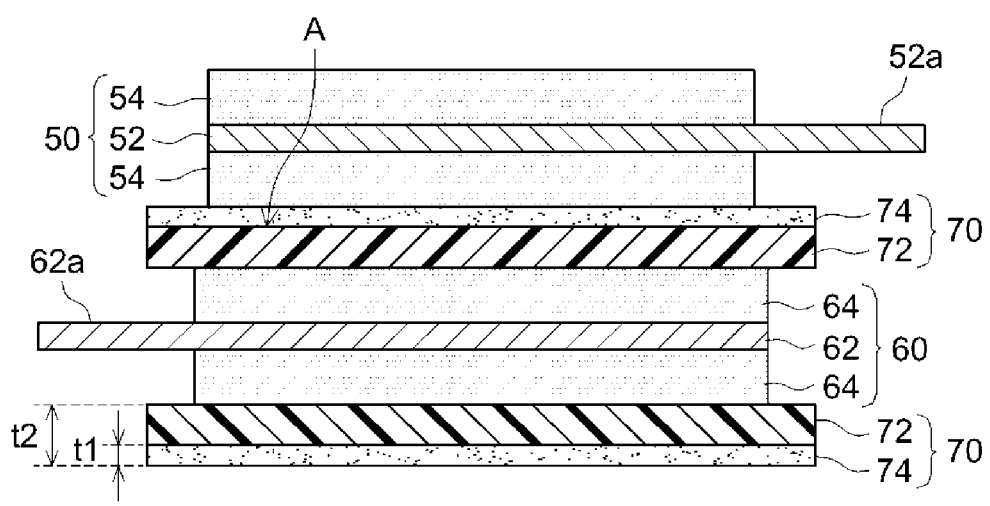
FIG. 3 is a cross-sectional diagram illustrating schematically a stack used to produce a wound electrode body of a lithium ion secondary battery according to the present embodiment.

FIG. 2 is a perspective-view diagram illustrating schematically a wound electrode body of the lithium ion secondary battery according to the present embodiment. FIG. 3 is a cross-sectional diagram illustrating schematically a stack used to produce the wound electrode body of the lithium ion secondary battery according to the present embodiment.

As illustrated in FIG. 2 a wound electrode body 20 of the present embodiment is constructed by arranging a sheet-shaped positive electrode 50 and a sheet-shaped negative electrode 60 opposing each other across separators 70. To produce the wound electrode body 20 firstly there is formed a stack 10 by laying up the sheet-shaped positive electrode 50 and the sheet-shaped negative electrode 60 across two separators 70. A wound electrode body 20 is then produced through winding of the stack 10. The materials that make up the wound electrode body 20 will be explained next.

(a) Positive Electrode

The positive electrode 50 is provided with a positive electrode collector 52 of aluminum foil or the like and a positive electrode mix layer 54 disposed on the surface (both faces) of the positive electrode collector 52. The positive electrode 50 is formed by coating a surface of the positive electrode collector 52 with a positive electrode paste being a precursor of the positive electrode mix layer 54, and drying then the paste, followed by rolling at a predetermined pressure.

A region (positive electrode exposed section 52a) at which the positive electrode mix layer 54 is not provided is formed on one side edge of the positive electrode 50 in the width direction. In the wound electrode body 20 of the present embodiment a positive electrode connection section 20a at which the positive electrode exposed section 52a is wound is formed at one side edge. As illustrated in FIG. 1, the positive electrode terminal 42 is connected to the positive electrode connection section 20a.

The positive electrode mix layer 54 shown in FIG. 2 contains a particulate positive electrode active material. For instance a lithium complex oxide capable of storing and releasing lithium ions is used as the positive electrode active material. As the lithium complex oxide there is preferably used an oxide containing lithium and one or more transition metal elements (lithium-transition metal complex oxide), or a phosphate compound containing lithium and one or more transition metal elements (lithium-transition metal phosphate compound). Concrete examples of lithium-transition metal oxides include for instance lithium-nickel-cobalt-manganese complex oxides (example: $LiNi_{1/3}Co_{1/3}Mn_{1/3}O_2$), lithium-nickel complex oxides (example: $LiNiO_2$), lithium-cobalt complex oxides (example: $LiCoO_2$), lithium-iron complex oxides (example: $LiFeO_2$), lithium-manganese complex oxides (example: $LiMn_2O_4$) and lithium-nickel-manganese complex oxides (example: $LiNi_{0.5}Mn_{1.5}O_4$). Examples of lithium-transition metal phosphate compounds include for instance lithium-iron phosphate compounds (example: $LiFePO_4$).

The positive electrode mix layer 54 may contain various additives other than the positive electrode active material described above. Examples of such additives include conductive materials and binders. As the conductive material there can be suitably used for instance carbon black such as acetylene black (AB), or other carbon materials (for instance, graphite). Examples of the binder that can be used include for instance polyvinylidene fluoride (PVdF).

A positive electrode 50 having the low-density positive electrode mix layer 54 is used in the present embodiment. Specifically, the density of the positive electrode mix layer in ordinary lithium ion secondary batteries is about 2.8 g/cc to 3.2 g/cc, but the density of the positive electrode mix layer 54 of the positive electrode 50 used in the present embodiment is adjusted to be in a range of 2.3 g/cc or more and 2.6 g/cc or less. The flexibility of the positive electrode 50 can be enhanced by forming such a low-density positive electrode mix layer 54. As explained in detail further on, this allows as a result securing sufficient flexibility in the stack 10 as a whole, and preventing drops in the production efficiency of the wound electrode body 20.

(b) Negative Electrode

The negative electrode 60 is provided with a negative electrode collector 62 such as a copper foil and a negative electrode mix layer 64 disposed on the surface (both faces) of the negative elect axle collector 62. Similarly to the positive electrode 50 described above, the negative electrode 60 is formed by coating a surface of the negative electrode collector 62 with a negative electrode paste being a precursor of the negative electrode mix layer 64, and drying then the paste, followed by rolling at a predetermined pressure.

A region (negative electrode exposed section 62a) at which tire negative electrode mix layer 64 is not applied is formed on one side edge of the negative electrode 60 in the width direction. In the wound electrode body 20 of the present embodiment a negative electrode connection section 20b at which the negative electrode exposed section 62a is wound is formed at one side edge. As illustrated in FIG. 1, the negative electrode terminal 44 is connected to the negative electrode connection section 20b.

The negative electrode mix layer 64 illustrated in FIG. 2 contains a particulate negative electrode active material. A carbon material capable of storing and releasing lithium ions is used in the negative electrode active material. For instance graphite, hard carbon or soft carbon is used as the carbon material. A composite material resulting from coating natural graphite particles with amorphous carbon can also be used herein.

The negative electrode mix layer 64 may contain additives other than the negative electrode active material. Examples of such additives include for instance binders and thickeners. Examples of binders for the negative electrode mix layer 64 include for instance styrene butadiene rubber (SBR). Examples of the thickener include for instance carboxymethyl cellulose (CMC).

(c) Separator

Each separator 70 is a sheet-shaped insulating member that is sandwiched between the positive electrode 50 and the negative electrode 60. The separators 70 have formed therein a plurality of small holes through which lithium ions, as charge carriers, can pass. As illustrated in FIG. 3, the separators 70 are provided with a sheet-shaped resin substrate layer 72 containing an insulating resin, and with a heat resistance layer 74 formed on one face of the resin substrate layer 72. Using the separators 70 having the such a heat resistance layer 74 allows suppressing thermal deformation of the separators 70, and curtailing the progress of cascading heat generation derived from an expanding short-circuit surface area.

Examples of the insulating resin that is used in the resin substrate layer 72 include for instance polyethylene (PE) and polypropylene (PP). Among the foregoing, a resin sheet (PE layer) made of polyethylene has a shutdown function of plugging holes for permeation of charge carriers, through shrinkage of the sheet when the battery temperature rises rapidly. A resin sheet (PP layer) made of polypropylene is excellent in heat resistance, and accordingly allows suppressing thermal deformation when battery temperature rises. The resin substrate layer 72 may be configured through laying of a plurality of resin sheets, and for instance there can be used a multilayer sheet being a stack of the above PE layer and PP layer. Separators 70 can be obtained in that case that suitably possess both a shutdown function and heat resistance.

The heat resistance layer 74 contains a metal compound (inorganic filler) excellent in heat resistance. Examples of the inorganic filler include for instance metal oxides such as alumina ($Al_2O_3$), magnesia (MgO), silica ($SiO_2$) and titania ($TiO_2$): metal nitrides such as aluminum nitride (AlN) and silicon nitride ($Si_3N_4$); and metal hydroxides such as calcium hydroxide ($Ca(OH)_2$), magnesium hydroxide ($Mg(OH)_2$) and aluminum hydroxide ($Al(OH)_3$). Among the foregoing alumina, magnesia and aluminum hydroxide exhibit not only excellent heat resistance and mechanical strength, but are moreover comparatively inexpensive, and therefore are used particularly preferably.

Various additives other than the inorganic filler may be added to the heat resistance layer 74. Examples of the additives include binders. Addition of a binder allows the heat resistance layer 74 and the resin substrate layer 72 to be suitably bonded to each other, thereby enhancing peel strength. An acrylic resin or the like may be used in the binder for the heat resistance layer 74.

Separators 70 having high peel strength are used in the present embodiment. In conventional art, specifically, separators have been used that have a peel strength of 15.1 N/m or less at the boundary between the resin substrate layer and the heat resistance layer, taking into consideration drops of production efficiency of the wound electrode body.

In the present embodiment, by contrast, separators 70 are used in which the peel strength of the boundary A between the rosin substrate layer 72 and the heat resistance layer 74 is 16 N/m or more and 155 N/m or less. Although explained in detail further on a lithium ion secondary battery 100 having increased capacity retention rate and excellent resistance to deterioration can be obtained by using high-peel strength separators 70 having a peel strength of 16 N/m or greater.

The term "peel strength" denotes herein 180° peel strength measured on the basis of the method pursuant to JIS Z0237:2009.

The ratio of a thickness t2 of the heat resistance layer 74 with respect to a thickness t1 of the separators 70 is preferably 0.1 to 0.4, more preferably 0.15 to 0.3, and is for instance set to 0.2. If the thickness t2 of the heal resistance layer 74 with respect to the thickness t1 of the separators 70 are excessively small, it becomes difficult to suppress thermal deformation in the separators 70, and there increases the likelihood of occurrence of cascading heat generation. If the heat resistance layer 74 is too thick, on the other hand, the flexibility of the separators 70 decreases, and the production efficiency of the wound electrode body 20 may be impaired.

(3) Nonaqueous Electrolyte Solution

An described above, a nonaqueous electrolyte solution (not shown) is accommodated inside the case 30 together with the wound electrode body 20. The nonaqueous electrolyte solution, which is filled in between the positive electrode 50 and the negative electrode 60, allows lithium ions, as charge carriers, to move through the nonaqueous electrolyte solution. The nonaqueous electrolyte solution is prepared by incorporating a supporting salt into an organic solvent (nonaqueous solvent). For instance ethylene carbonate (EC), dimethyl carbonate (DMC) and ethyl methyl carbonate (EMC) can be used as the organic solvent. These materials can be used singly or in combinations of two or more types. A lithium salt such its $LiPF_6$ or $LiBF_4$ can be suitably used as the supporting salt. The concentration of the supporting salt is preferably 0.7 M to 1.3 M (for instance 1 M). Besides the supporting salt, the nonaqueous electrolyte solution may also contain additives such as a gas generating agent, a dispersant, a thickener and a film forming agent.

(4) Peel Strength of Heat Resistance Layer and Density of Positive Electrode Mix Layer In the lithium ion secondary battery 100 according to the present embodiment, as described above, high-peel strength separators 70 are used in which the peel strength of the boundary A between the resin substrate layer 72 and the heat resistance layer 74, illustrated in FIG. 3, is 16 N/m or greater, and a positive electrode 50 is used in which there is formed the low-density positive electrode mix layer 54 having a density of 2.6 g/cc or lower.

Resistance to deterioration of the lithium ion secondary battery ordinarily increases when using high-peel strength separators 70 having a peel strength of 16 N/m or greater, but on the other hand the flexibility of the stack 10 as a whole decreases, and it becomes difficult to bend and wind the stack 10, which results in a significant drop in the production efficiency of the wound electrode body 20.

In the lithium ion secondary battery 100 according to the present embodiment, by contrast, there is formed the low-density positive electrode mix layer 54 having a density of 2.6 g/cc or lower, which translates into enhanced flexibility of the positive electrode 50. As a result it becomes possible to secure sufficient flexibility in the stack 10 as a whole, despite the use of the high-peel strength separators 70. The stack 10 can be accordingly bent and wound easily.

The present embodiment allows therefore using high-peel strength separators 70 without loss of production efficiency of the wound electrode body 20, and accordingly a lithium ion secondary battery 100 excellent in resistance to deterioration can be supplied stably.

The flexibility of the separators 70 drops significantly when the peel strength of the boundary A between the heat resistance layer 74 and the resin substrate layer 72 exceeds 155 N/m. As a result, the distance (inter-electrode distance) between the positive electrode 50 and the negative electrode 60 at bends (rounded portions) becomes readily nonuniform upon expansion or shrinking of the wound electrode body 20 during charge/discharge. In that case there may occur for instance intrusion of a degradation gas between the electrodes, or the liquid volume of the nonaqueous electrolyte solution may become uneven, which may result in a drop in resistance to deterioration. In the present embodiment, in consequence, the peel strength of the boundary A between the heat resistance layer 74 and the resin substrate layer 72 is prescribed to be 155 N/m or less.

The rigidity of the positive electrode 50 drops excessively when the density of the positive electrode mix layer 54 is set to be lower than 2.3 g/cc. As a result the positive electrode 50 breaks readily on account of the tension acting thereon during winding of the stack 10, and the shape of the produced wound electrode body 20 collapses readily. This may entail a drop in production efficiency. In view of the above circumstances, the density of the positive electrode mix layer 54 in the present embodiment is prescribed to be 2.3 g/cc or higher.

The peel strength of the boundary A between the heat resistance layer 74 and the resin substrate layer 72 is preferably 21 N/m or more and 102 N/m or less. The capacity retention rate of the lithium ion secondary battery 100 can be enhanced more suitably as a result. Specifically, the above-described unevenness in inter-electrode distance caused by a decrease in flexibility of the separators 70 starts to occur when the peel strength of the boundary A exceeds 102 N/m. Accordingly, the upper limit of the peel strength of the heat resistance layer 74 is preferably set to be 102 N/m or less. When the peel strength of the boundary A is adjusted to be within the above range, the effect of suppressing degradation of high-rate charge/discharge properties can also be exerted, leading to increase in resistance to deterioration more suitably.

2. Method for Producing Lithium Ion Secondary Battery

A method for producing the lithium ion secondary battery 100 according to the embodiment described above will be explained next. The method for producing a lithium ion secondary battery according to the present embodiment includes a winding step and a sealing step. These steps will each be explained in turn below.

(1) Winding Step

In the winding step, the stack 10 is formed through laying of the positive electrode 50 and the negative electrode 60 across the interposed separators 70, followed by winding of the stack 10, to thereby produce the wound electrode body 20. The winding step will be explained next divided into "formation of a stack" and "winding of the slack".

(a) Formation of Stack

In this step the various members, namely a separator 70, the negative electrode 60, a separator 70 and the positive electrode 50 are laid up in this order from the bottom in FIG. 3, to form the stack 10. The members are laid while the respective arrangement positions thereof in the width direction of the positive electrode 50 and the negative electrode 60 are offset in such a manner that the positive electrode exposed section 52a protrudes from a first side edge (right side in the figure) and the negative electrode exposed section 62a protrudes from a second side edge (left side in the figure).

In the present embodiment there is used the high-peel strength separators 70 in which the peel strength of the boundary A between the resin substrate layer 72 and the heat resistance layer 74 is 16 N/in or more and 155 N/m or less. Examples of means for producing such high-peel strength separators 70 include for instance adjusting the binder addition amount in the heat resistance layer 74. Specifically, the peel strength of the boundary A can be easily adjusted to be in a range of 16 N/m or more and 155 N/m or less by adjusting the weight ratio of the filler and live binder in the heat resistance layer 74 to be in a range of 90:10 to 92:8.

In the present embodiment there is used the low-density positive electrode 50 in which the density of the positive electrode mix layer 54 is 2.3 g/cc or more and 2.6 g/cc or less. An example of means for producing the low-density positive electrode 50 includes for instance adjusting the pressure during rolling of the positive electrode 50 after drying of a positive electrode paste. As a result, it becomes possible to produce easily a positive electrode 50 in which the density of the positive electrode mix layer 54 is 2.3 g/cc or more and 2.6 g/cc or less. Pressure during rolling is preferably adjusted as appropriate taking into consideration for instance the materials of the positive electrode 50.

In the production method according to the present embodiment the various sheet-shaped members are laid in such a manner that the heat resistance layer 74 of the separators 70 and the positive electrode mix layer 54 of the positive electrode 50 oppose each other. Specifically, the top separator 70 in FIG. 3 is laid so that the heat resistance layer 74 thereof is disposed at the top (on the side of the positive electrode 50). The bottom separator 70 in FIG. 3, by contrast, is laid so that the heat resistance layer 74 thereof is disposed at the bottom (on the side opposite that of the negative electrode 60). By arranging thus the various sheet-shaped members, respective heat resistance layers 74 can be caused to oppose respective positive electrode mix layers 54, during winding of the stack 10.

(b) Winding of Stack

The produced stack 10 is next wound in the winding step, to produce the wound electrode hotly 20. In the production method according to the present embodiment there is used the positive electrode 50 having excellent, flexibility in that the density of the positive electrode mix layer 54 is 2.3 g/cc or more and 2.6 g/cc or less. As a result sufficient flexibility of the stack 10 as a whole can be secured, occurrences of winding defects such as winding deviation can be suppressed, and it becomes possible to produce the wound electrode body 20 with high production efficiency.

Figure 4:
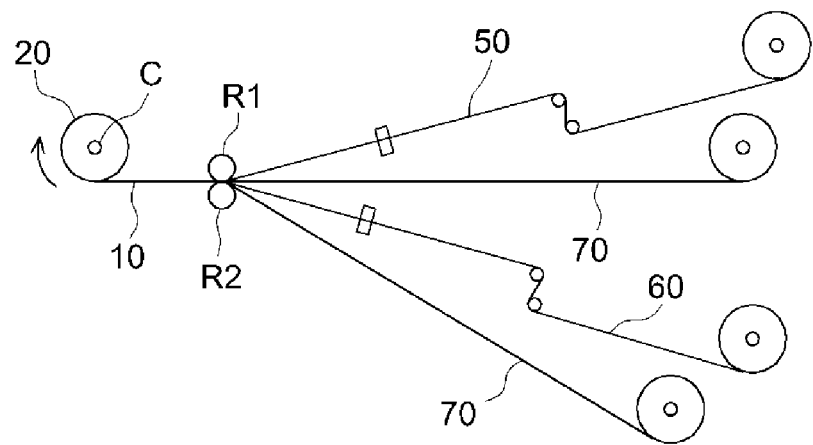
FIG. 4 is a diagram for explaining a winding step of a method for producing a lithium ion secondary battery according to an embodiment of the present invention.

Formation and winding of the stack described above are preferably carried out continuously in a same production line, as illustrated in FIG. 4. In such a production line, the sheet-shaped positive electrode 50, sheet-shaped negative electrode 60 and separators 70 are supplied towards the winding axis C, the stack 10 is produced by nipping the sheet-shaped members halfway along tire supply path thereof, between a pair of rollers R1. R2, and the stack 10 is wound, as-is, about the winding axis C. Formation and winding of the stack can be accomplished continuously as a result, and hence the productivity of the wound electrode body 20 can be increased more suitably.

In a case where such a production line is provided, the stack 10 is wound a predetermined number of times, after which the resulting stack 10 is cut, and the stack 10 wound around the winding axis C is recovered, and is pressed at a predetermined pressure, to thereby yield a wound electrode body 20 of flat shape, such as the one illustrated in FIG. 2.

In a case where the wound electrode body 20 is produced as illustrated in FIG. 4, it is preferable to adjust the tensions in the positive electrode 50, the negative electrode 60 and the separators 70 in such a manner that the tension in the positive electrode 50 and the negative electrode 60 tire higher than the tension in the separators 70. As a result, lubricity at the boundaries of the sheet-shaped members can be improved, and the occurrence of winding deviation can be suppressed more suitably.

The tension in the positive electrode 50 and the negative electrode 60 while the stack 10 is being wound around the winding axis C is preferably adjusted to be for instance 2.5 N to 12.0 N, and the tension in the separator is preferably adjusted to be for instance 1.0 N to 6.0 N. Breakage of the sheet-shaped members and the occurrence of winding defects such as winding deviation can be suitably suppressed as a result.

(2) Sealing Step

In the present step the wound electrode body 20 produced its described above is accommodated into the case 30 together with a nonaqueous electrolyte solution, as illustrated in FIG. 1, and the case 30 is sealed. Specifically, firstly the positive electrode terminal 42 is connected to the positive electrode connection section 20a of the wound electrode body 20 and the negative electrode terminal 44 is connected to the negative electrode connection section 20b, from among the pair of the electrode terminals provided in the lid body 34. Next, the wound electrode body 20 is accommodated inside the case body 32, and the opening of the top face of the case body 32 is plugged with the lid body 34. The case body 32 and the lid body 34 are joined to each other by laser welding or the like. Then, the nonaqueous electrolyte solution is filled into the case 30 through a filling port (not shown) formed in the lid body 34. The filling port is sealed with the sealing member, to thereby seal the case 30. As a result, there is produced the lithium ion secondary battery 100 in which the wound electrode body 20 and the nonaqueous electrolyte solution are accommodated in the case 30.

The lithium ion secondary battery 100 thus produced uses the separators 70 having a high peel strength of 16 N/m or more and 155 N/m or less; accordingly, the capacity retention rate is enhanced and the battery boasts better resistance to deterioration than conventional batteries.

In the present embodiment there is used the positive electrode 50 having the positive electrode mix layer 54 having a low density of 2.3 g/cc or more and 2.6 g/cc or less. As a result, drops in the production efficiency of the wound electrode body 20 are suppressed despite the use of the high-peel strength separators 70.

Therefore the production method according to the present embodiment allows supplying stably a lithium ion secondary battery 100 that is excellent in resistance to deterioration.

In the present embodiment that involves forming the low-density positive electrode mix layer 54 there is a chance of a slight drop in battery capacity in the produced lithium ion secondary battery 100 drops somewhat. Therefore the lithium ion secondary battery 100 produced relying on the production method according to the present embodiment can be used, particularly preferably, for instance in fields where resistance to deterioration is more important than battery capacity (for instance in drive power sources of HV vehicles).

3. Other Embodiments

The lithium ion secondary battery 100 has been explained above as an example of the nonaqueous electrolyte secondary battery disclosed herein, but the present invention is not limited to the embodiment described above, and can accommodate various alterations and modifications.

In the embodiment described above, for instance, the various members including the positive electrode 50, the negative electrode 60 and the separators 70 are laid in such a manner that the heat resistance layer 74 and the positive electrode mix layer 54 oppose each other. However, the electrode that opposes the heat resistance layer is not particularly limited, and for instance the effect of the present invention can be suitably exerted also in a case where the negative electrode mix layer and the heat resistance layer are set to oppose each other.

Preferably, however, the heat resistance layer 74 and the positive electrode mix layer 54 are set to oppose each other, as in the above embodiment, from the viewpoint of improving production efficiency more suitably. In a case where the heal resistance layer 74 and the positive electrode mix layer 54 are thus set to oppose each other, chargeability and lubricity at the boundary between the positive electrode 50 and the separators 70 during winding of the stack 10 can be improved, and accordingly the stack 10 can be wound yet more easily.

Test Examples

Test examples pertaining to the present invention will be explained next, but the explanation of the test examples is not meant to limit the present invention in any way.

1. Samples

In the present invention, 35 types of lithium ion secondary batteries (Samples 1 to 35) were produced by varying the peel strength of the resin substrate layer and the heat resistance layer, and varying the density of the positive electrode mix layer.

Specifically, firstly a positive electrode active material ($LiNi_{1/3}Co_{1/3}Mn_{1/3}O_2$), a conductive material (acetylene black: AB) and a binder (PVdF) were mixed at a ratio by weight of 90:8:2. A positive electrode paste was produced through firm churning of the obtained powder material while under addition of a dispersion medium (N-methylpyrrolidone: NMP). The positive electrode paste was applied onto both faces of a positive electrode collector (aluminum foil), followed by drying and rolling, to thereby produce a sheet-shaped positive electrode.

In the present test example the wiling pressure alter drying was adjusted to thereby modify the density of the respective positive electrode mix layer of each sample. The density of the positive electrode mix layer of each sample is given in Table 1.

Next, a powder material for a negative electrode was prepared by mixing a negative electrode active material, a thickener (CMC) and a binder (SBR) at a ratio by weight of 98:1:1. In the present test example a composite carbon material of natural graphite particles coated with amorphous carbon was used as the negative electrode active material.

A negative electrode paste was then produced through firm churning of the prepared powder material while under addition of a dispersion medium (NMP). The negative electrode paste was applied onto both faces of a negative electrode collector (copper foil), followed by drying and rolling, to thereby produce a sheet-shaped negative electrode.

A separator provided with a heal resistance layer was produced in the present test example. Firstly, an inorganic filler (alumina particles) and a binder (acrylic resin) were mixed, and the whole was kneaded while under addition of deionized water, to thereby produce a paste for heat resistance layer formation. Next, the paste for heat resistance layer formation was applied onto one face of a resin substrate layer having an average thickness of 16 μm, with drying, to produce as a result a separator having a heat resistance layer (average thickness: 4 μm) formed on one face of the resin substrate layer. In the present test example, the peel strength of the boundary between the heat resistance layer and the resin substrate layer of each sample was caused to vary through adjustment of the ratio of the filler and the binder in the heat resistance layer.

Peel strength was measured on the basis of the method pursuant to JIS 20237:2009. Specifically, the face of each separator, cut to 15 mm×120 mm and having the heat resistance layer formed thereon, was fixed to a stand using a double-sided tape, and the resin substrate layer was pulled in a direction (180°) parallel to the heat resistance layer, as a result of which the resin substrate layer was continuously peeled over about 65 mm at a rate of about 20 mm per minute. The average value of the tensile load exerted during peeling of the resin substrate layer was taken as the peel strength. The measurement results are given in Table 1.

Next, a stack was formed in which the positive electrode and the negative electrode were laid up on each other across two separators, after which the stack was wound, to produce a wound electrode body. Specifically, a production line such as the one illustrated in FIG. 4 was provided, and the positive electrode 50, the negative electrode 60 and two separators 70 were supplied towards the winding axis C. and were nipped between rollers R1, R2 halfway in the supply path, to thereby produce the stack 10. The stack 10 was wound around the winding axis C. and thereafter was pressed under a predetermined pressure, to thereby produce the wound electrode body 20.

Herein the tension in the positive electrode 50, the negative electrode 60 and the separators 70 were adjusted in such a manner that the tensions on the positive electrode 50 and the negative electrode 60 were higher than the tension in the separators 70. The tension in the positive electrode 50 and the negative electrode 60 were adjusted to be 2.5 N to 12.0 N, and the tension in the separators 70 was adjusted to be 1.0 N to 6.0 N.

In Samples 1 to 25 the sheet-shaped members were laid up in such a manner that the heat resistance layer and the positive electrode mix layer opposed each other, while in Samples 26 to 35 the sheet-shaped members were laid up in such a manner that the heal resistance layer and the negative electrode mix layer opposed each other (see Table 1).

Each produced wound electrode body and electrode terminals were connected, a feature wherein the whole was accommodated in a square case made of aluminum, together with an electrolyte solution, and the case was sealed, to thereby construct a respective lithium ion secondary battery (Samples 1 to 35) for an evaluation test. The electrolyte solution used in the present test example w as a nonaqueous electrolyte solution obtained by dissolving a supporting salt (LiPF$_6$), to a concentration of about 1 M, in a mixed solvent being a mixture of EC, EMC and DMC at a 1:1:1 volume ratio.

2. Evaluation Test

The lithium ion secondary batteries in Samples 1 to 35 described above were evaluated for (1) winding deviation defect rate, (2) capacity retention rate and (3) IV resistance increase rate. The relevant evaluation methods are explained next.

(1) Evaluation of Winding Deviation Defect Rate

There were produced 50 batteries of each of the lithium ion secondary batteries of the respective samples, all the batteries where imaged with X-rays, and there was observed whether winding deviation occurred or not in the wound electrode body. For instance, a stack winding defect was determined to have occurred in those batteries w here the separator tailed to cover the positive electrode or the negative electrode, and in batteries where the negative electrode failed to cover the positive electrode. The proportion of batteries in which these winding defects occurred was calculated, to work out a "winding deviation defect rate (%)". The results are illustrated in Table 1 and FIG. 5.

(2) Evaluation of Capacity Retention Rate

In the present test example there was measured the capacity retention rate of the lithium ion secondary batteries in Samples 1 to 35. Specifically, each sample was subjected to 1000 charge/discharge cycles each involving one charge and one discharge at 2 C, at 60° C. The battery capacity after the 1000 cycles was measured, and the ratio of the battery capacity alter the 1000 cycles with respect to the initial battery capacity was calculated as the capacity retention rate. The results are illustrated in Table 1 and FIG. 6. The higher the capacity retention rate of a given battery, the smaller can be regarded to be the deterioration in battery performance.

(3) Evaluation of IV Resistance Increase Rate

In the present test example there was measured next the increase rate of IV resistance of the lithium ion secondary batteries of the samples. Specifically there was measured the initial IV resistance of each sample. The measurement of IV resistance was as follows.

Firstly, the battery of each sample was pre-charged at constant current and constant voltage (CCCV) at 5 A, up to 3.5 V, to adjust the battery to a state of charge (SOC) of 60%. The total charging lime was set to 1 hour. Thereafter, the battery was discharged at constant current (CC) for 10 seconds at 60 A, and the internal resistance (IV resistance) was worked out on the basis of the slope of a first-order approximation straight line of plotted values of current (I) voltage (V).

The battery was then charged at a charging current of 5 C at 25° C., the battery was then discharged at high rate (discharge current 20 C) in an environment at−15° C. The IV resistance after discharge was measured, and the ratio of the IV resistance after discharge with respect to the initial IV resistance was calculated. This ratio of IV resistance denotes the degree of change of IV resistance derived from high-rate discharge in a low-temperature environment. It is deemed that the higher the ratio, the greater is the degradation in performance derived from hi eh-rate discharge in a low-temperature environment. [Table 1]

TABLE 1

| | Peel strength of resin substrate layer and heat resistance layer (N/m) | Density of positive electrode mix layer (g/cc) | Mix layer to opposed to heat resistance layer | Winding deviation defect rate (%) | Capacity retention rate (%) | IV resistance increase rate (%) |
|---|---|---|---|---|---|---|
| Sample 1 | 16 | 2.3 | Positive electrode | 0.2 | 80.2 | 10.5 |
| Sample 2 | 21 | 2.3 | Positive electrode | 2.2 | 83.2 | 4.3 |
| Sample 3 | 55 | 2.3 | Positive electrode | 0.8 | 84.3 | 2.2 |
| Sample 4 | 102 | 2.3 | Positive electrode | 3.6 | 84.4 | 3.0 |
| Sample 5 | 155 | 2.3 | Positive electrode | 0.6 | 81.0 | 7.9 |
| Sample 6 | 16 | 2.6 | Positive electrode | 3.7 | 81.1 | 11.5 |
| Sample 7 | 21 | 2.6 | Positive electrode | 1.0 | 84.1 | 2.2 |
| Sample 8 | 55 | 2.6 | Positive electrode | 2.0 | 84.8 | 3.3 |
| Sample 9 | 102 | 2.6 | Positive electrode | 1.8 | 84.1 | 4.0 |
| Sample 10 | 155 | 2.6 | Positive electrode | 0.1 | 81.0 | 7.9 |
| Sample 11 | 16 | 2.0 | Positive electrode | 20.9 | 81.1 | 10.8 |

TABLE 1-continued

| | Peel strength of resin substrate layer and heat resistance layer (N/m) | Density of positive electrode mix layer (g/cc) | Mix layer to opposed to heat resistance layer | Winding deviation defect rate (%) | Capacity retention rate (%) | IV resistance increase rate (%) |
|---|---|---|---|---|---|---|
| Sample 12 | 21 | 2.0 | Positive electrode | 15.8 | 84.1 | 10.5 |
| Sample 13 | 55 | 2.0 | Positive electrode | 17.4 | 85.0 | 10.8 |
| Sample 14 | 102 | 2.0 | Positive electrode | 15.7 | 84.7 | 12.6 |
| Sample 15 | 155 | 2.0 | Positive electrode | 17.4 | 80.8 | 11.6 |
| Sample 16 | 16 | 2.2 | Positive electrode | 18.2 | 80.0 | 11.3 |
| Sample 17 | 21 | 2.2 | Positive electrode | 9.8 | 83.2 | 12.0 |
| Sample 18 | 55 | 2.2 | Positive electrode | 16.0 | 84.4 | 11.8 |
| Sample 19 | 102 | 2.2 | Positive electrode | 19.0 | 84.6 | 12.5 |
| Sample 20 | 155 | 2.2 | Positive electrode | 12.5 | 80.6 | 12.0 |
| Sample 21 | 16 | 2.8 | Positive electrode | 10.5 | 80.4 | 10.2 |
| Sample 22 | 21 | 2.8 | Positive electrode | 8.4 | 83.7 | 11.7 |
| Sample 23 | 55 | 2.8 | Positive electrode | 22.2 | 84.7 | 11.5 |
| Sample 24 | 102 | 2.8 | Positive electrode | 11.0 | 84.4 | 10.6 |
| Sample 25 | 155 | 2.8 | Positive electrode | 11.6 | 82.4 | 12.6 |
| Sample 26 | 16 | 2.3 | Negative electrode | 6.6 | 80.1 | 10.8 |
| Sample 27 | 21 | 2.3 | Negative electrode | 4.4 | 83.6 | 3.4 |
| Sample 28 | 55 | 2.3 | Negative electrode | 5.8 | 84.3 | 2.4 |
| Sample 29 | 102 | 2.3 | Negative electrode | 7.8 | 84.8 | 4.9 |
| Sample 30 | 155 | 2.3 | Negative electrode | 3.9 | 82.7 | 7.8 |
| Sample 31 | 16 | 2.6 | Negative electrode | 4.0 | 80.3 | 12.0 |
| Sample 32 | 21 | 2.6 | Negative electrode | 6.6 | 83.3 | 3.1 |
| Sample 33 | 55 | 2.6 | Negative electrode | 5.5 | 84.9 | 3.7 |
| Sample 34 | 102 | 2.6 | Negative electrode | 6.1 | 83.3 | 2.6 |
| Sample 35 | 155 | 2.6 | Negative electrode | 7.1 | 82.5 | 8.0 |

Figure 5:
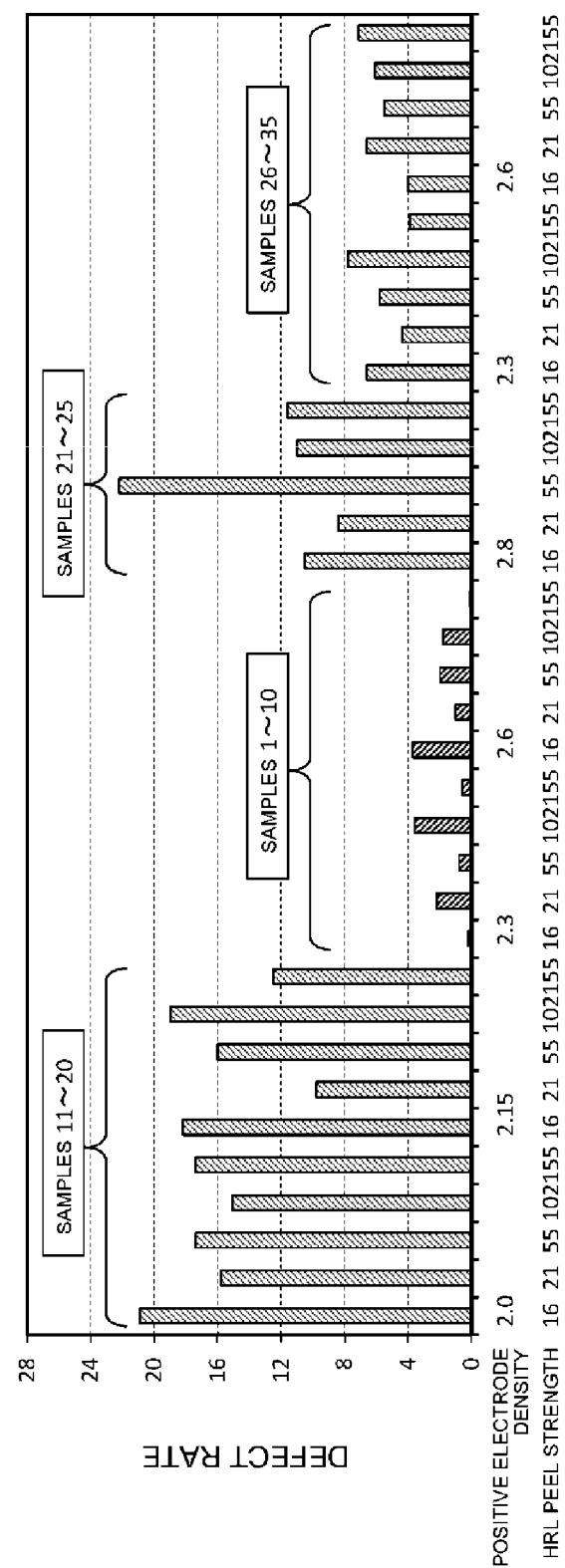
FIG. 5 is a graph illustrating measurement results of incidence of winding deviation in a test example.
Figure 6:
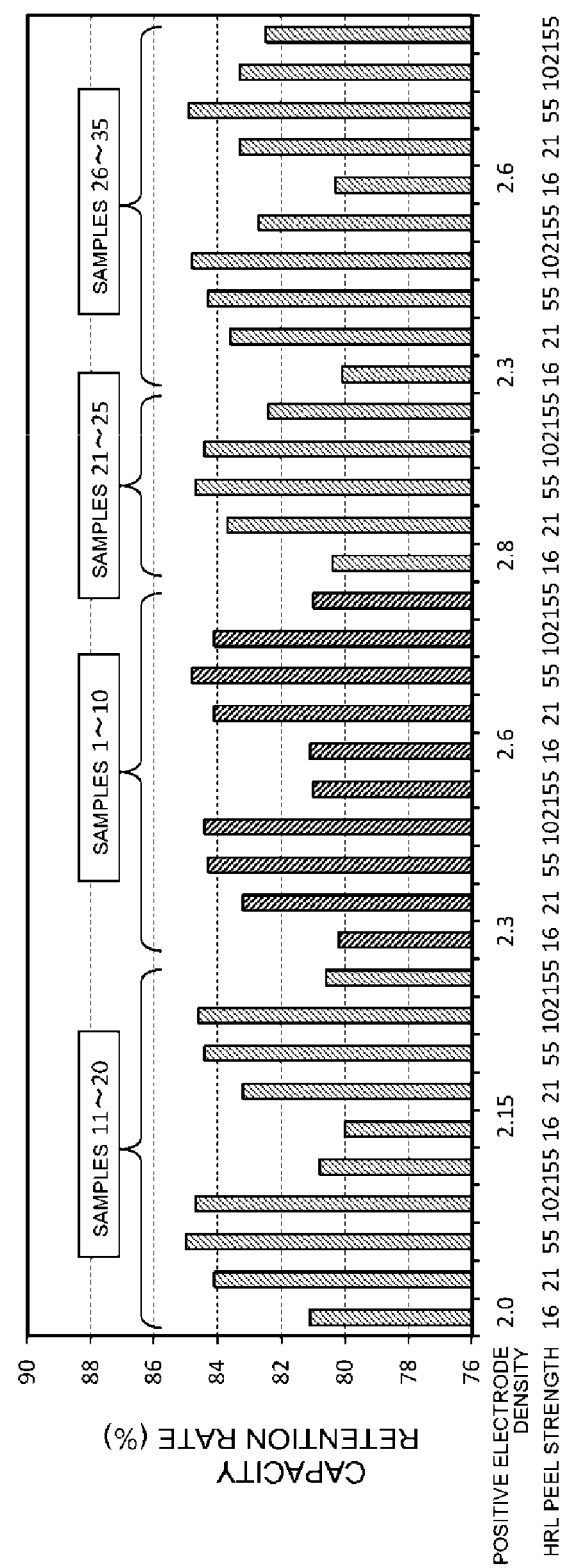
FIG. 6 is a graph illustrating measurement results of capacity retention rate in a test example.

As Table 1, FIG. 5 and FIG. 6 reveal, Samples 11 to 25 exhibited a high capacity retention rate, of 80% or higher, but the winding deviation defect rate tended to be high. This indicated that when a separator is used in which the peel strength of the heat resistance layer is 16 N/m or greater, a lithium ion secondary battery can be produced that is excellent in resistance to deterioration but, however, it is difficult to supply stably the battery on account of the low production efficiency. This can be ascribed to the difficulty of winding the stack, on account of lower stack flexibility when using a high-peel strength separator.

By contrast, Samples 1 to 10 exhibited a high capacity retention rate, of 80% or higher, and curtailment of the winding deviation defect rate to 4% or less. This revealed that a secondary battery can be produced with high efficiency, despite using a separator having a peel strength of 16 N/m or greater, by prescribing the density of the positive electrode mix layer to be in a range of 2.3 g/cc or more and 2.6 g/cc or less. This result can be ascribed to the fact that sufficiently flexibility of the stack as a whole can be secured through the use of a positive electrode having a low-density positive electrode mix layer.

Samples 2 to 4 and 7 to 9 exhibited a particularly high capacity retention rate, of 83% or higher, from among Samples 1 to 10. This suggested that resistance to deterioration can be further improved by adjusting the peel strength of the boundary between the resin substrate layer and the heat resistance layer to be 21 N/m or more and 102 N/m or less.

In Samples 26 to 35 as well, the winding deviation defect rate w as curtailed despite the use of a high-peel strength separator. These results revealed that the effect of the present invention can be suitably brought out even when the heat resistance layer of the separator is set to oppose the negative electrode mix layer. However, a comparison between Samples 1 to 10 and Samples 26 to 35 revealed that the winding deviation defect rate was more suitably curtailed in Samples 1 to 10. This suggested that the heat resistance layer and the positive electrode mix layer are set preferably to oppose each other, from the viewpoint of suppressing drops in production efficiency.

Figure 7:
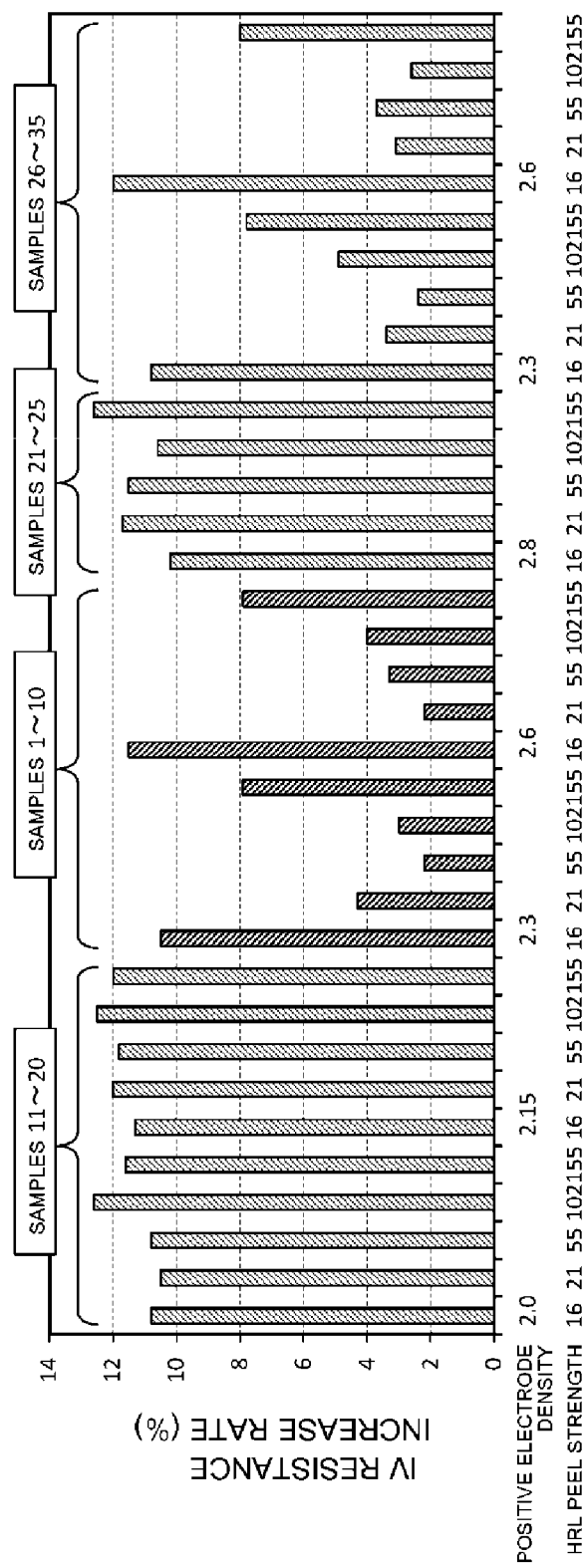
FIG. 7 is a graph illustrating measurement results of IV resistance increase rate in a test example.

As FIG. 7 and Table 1 reveal, a comparison between the increase rate of IV resistance in the samples made manifest that the increase rate in IV resistance was considerably suppressed in particular in Samples 2 to 4 and 7 to 9. This revealed that degradation of high-rate charge/discharge properties can be suppressed, and accordingly yet superior resistance to deterioration can be obtained, by prescribing the density of the positive electrode mix layer to be 2.3 g/cc to 2.6 g/cc and the peel strength of the heat resistance layer to be 21 N/m to 102 N/m.

Concrete examples of the present invention have been explained in detail above, but the examples are merely illustrative in nature, and are not meant to limit the scope of the claims in any way. The features set forth in the claims can accommodate various modifications and alterations of the concrete examples illustrated above.

What is claimed is:
1. A method for producing a nonaqueous electrolyte secondary battery in which a wound electrode body and a nonaqueous electrolyte solution are accommodated in a case, the method comprising:
   a winding step of producing a wound electrode body by stacking a positive electrode and a negative electrode across a separator to produce a stack, followed by winding the stack; and
   a sealing step of accommodating the wound electrode body and the nonaqueous electrolyte solution in the case, followed by sealing the case,
   wherein the positive electrode has a foil-shaped positive electrode collector, and a positive electrode mix layer provided on a surface of the positive electrode collector; and
   the separator has a resin substrate layer containing an insulating resin, and a heat resistance layer formed on one face of the resin substrate layer;
   the peel strength of a boundary between the resin substrate layer and the heat resistance layer is set to 16 N/m or more and 155 N/m or less and the density of the positive electrode mix layer is set to 2.3 g/cc or more and 2.6 g/cc or less,
   the positive electrode, the negative electrode and the separator are stacked in such a manner that the heat resistance layer of the separator and the positive electrode mix layer of the positive electrode oppose each other, in the winding step, the stack is produced by nipping the positive electrode, the negative electrode and the separator between a pair of rollers, and the stack is supplied towards a winding axis, and the tension in the positive electrode and the negative electrode during winding of the stack is set to be higher than the tension in the separator, the tension in the positive electrode and the negative electrode is adjusted to be in a range of 2.5 N to 12.0 N, and the tension in the separator is adjusted to be in a range of 1.0 N to 6.0 N.

* * * * *